United States Patent [19]

Büchel et al.

[11] 3,872,095

[45] Mar. 18, 1975

[54] N-TRITYL-IMIDAZOLES AND THEIR PRODUCTION

[75] Inventors: Karl-Heinz Büchel, Leverkusen; Erik K. Regel, Wuppertal-Kronenberg; Manfred Plempel, Wuppertal-Elberfeld, all of Germany

[73] Assignee: Bayer Aktiengesellschaft, Leverkusen, Germany

[22] Filed: Jan. 17, 1972

[21] Appl. No.: 218,520

Related U.S. Application Data

[60] Continuation of Ser. No. 13,797, Feb. 24, 1970, Pat. No. 3,705,172, which is a division of Ser. No. 758,594, Sept. 9, 1968, Pat. No. 3,660,577.

[30] Foreign Application Priority Data

Sept. 15, 1967 Germany.............................. 535043

[52] U.S. Cl................ 260/309, 424/273, 260/309.2
[51] Int. Cl............................................ C07d 49/36
[58] Field of Search...................... 260/309; 424/273

[56] References Cited
UNITED STATES PATENTS

| | | | |
|---|---|---|---|
| 2,404,300 | 7/1946 | Kyrides et al....................... | 260/309 |
| 3,275,649 | 9/1966 | Podesva et al...................... | 260/309 |
| 3,299,090 | 1/1967 | Hoff et al............................ | 260/309 |
| 3,321,366 | 5/1967 | Mussell et al......................... | 167/33 |
| 3,322,783 | 5/1967 | Dunn et al........................ | 260/309.2 |
| 3,391,156 | 7/1968 | Beaman et al...................... | 260/309 |

OTHER PUBLICATIONS

Giesemann, "Chem. Ber.," 1959, Vol. 92, pp. 92–98, and 1960, Vol. 93, pp. 570–583.

*Primary Examiner*—John D. Randolph

[57] ABSTRACT

N-trityl-imidazoles and salts thereof of the formula

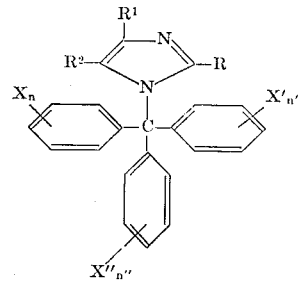

wherein R, $R^1$ and $R^2$ are hydrogen, lower alkyl or phenyl, or $R^1$ and $R^2$ together form an anellated benzene ring, X, X' and X'' are alkyl of 1 to 12 carbon atoms or an electro-negative moiety, and n, n' and n'' are an integer from 0 to 2, or pharmaceutically acceptable acid salts thereof may be produced by reacting a silver salt or alkali metal salt of an imidazole of the formula:

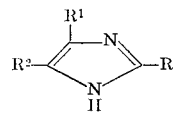

with a trityl halide of the formula:

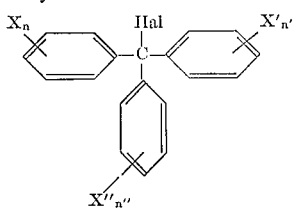

wherein the substituents are as above defined and Hal is halogen. These compounds are useful as antimycotics.

9 Claims, No Drawings

N-TRITYL-IMIDAZOLES AND THEIR PRODUCTION

This is a continuation application of Ser. No. 13,797 filed Feb. 24, 1970, now U.S. Pat. No. 3,705,172 granted 12-5-72, which is a divisional of Ser. No. 758,594 filed Sept. 9, 1968, now U.S. Pat. No. 3,660,577 granted May 2, 1972.

The present invention is concerned with N-trityl imidazoles and salts thereof and the production of such compounds. More particularly, the present invention is concerned with N-trityl-imidazoles and salts thereof of the formula:

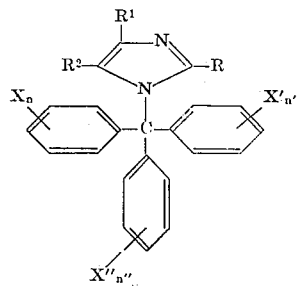

(I)

wherein R, $R^1$ and $R^2$ are hydrogen, lower alkyl or phenyl, or $R^1$ and $R^2$ together form an anellated benzene ring, X, X' and X'' are alkyl of 1 to 12 carbon atoms or an electro-negative moiety, and n, n' and n'' are an integer from 0 to 2, or pharmaceutically acceptable acid salts thereof. When R, $R^1$ or $R^2$ are alkyl moieties, those having 1 to 4 carbon atoms are preferred. When X, X' or X'' is an alkyl moiety, it is preferred that such have 1 to 12 carbon atoms and such moieties having 1 to 4 carbon atoms are especially preferred. Electro-negative substituents which are particularly preferred are the halogens, i.e., fluorine, chlorine, bromine and iodine, $NO_2$, $CF_3$, CN, as well as S-lower alkyl and O-lower alkyl; it is preferred that the alkyl moieties have 1 to 4 carbon atoms. The term "alkyl" and "lower alkyl" comprises straight chain as well as branched chain alkyl moieties and also include those containing a double bond.

The salts of the N-trityl-imidazoles (I) are the pharmaceutically acceptable non-toxic acid salts. Examples of suitable acids are the hydrohalic acids (hydrochloric being particularly preferred), phosphoric acid, mono- and bifunctional carboxylic acids, such as acetic acid, propionic acid, maleic acid, succinic acid, fumaric acid, tartaric acid, citric acid, salicylic acid, sorbic acid, lactic acid and 1,5-naphthalene-disulphonic acid. The hydrohalides, especially the hydrochlorides, lactates and salicylates are of particular value.

In a particularly preferred embodiment of the present invention, the N-trityl-imidazoles have the formula:

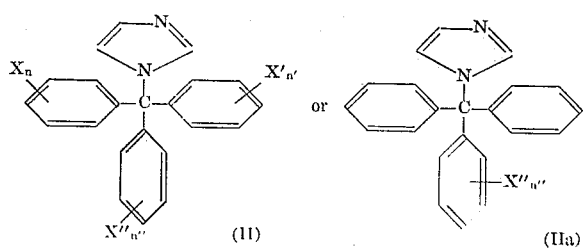

wherein X, X' and X'' are alkyl of 1 to 12 carbon atoms or electro-negative substituents and n, n' and n'' are 1 or 2. With regard to Formula IIa, particularly preferred substituent values are those where X'' is fluorine, chlorine, bromine, iodine, $NO_2$, $CF_3$, CN, $SCH_3$, $OCH_3$ and n'' is 1.

The compounds of the present invention can be prepared according to techniques per se known, such as by reacting silver salts or alkali metal salts, in particular the potassium salts of imidazoles of the Formula III with trityl halides of the Formula IV:

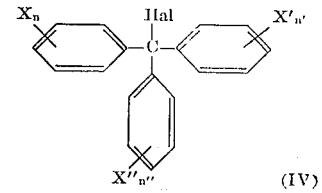

wherein R, $R^1$ and $R^2$, X, X' and X'' and n, n' and n'' have the above meanings and Hal is chlorine, bromine or iodine, in an inert solvent such as benzene, toluene, hexane, cyclohexane or diethyl ether, at a temperature of from about 20°C to about 110°C [cf. Chem. Ber. 92, 92 (1959); 93, 570 (1960)].

The compounds of the present invention can also be prepared according to techniques per se known by reacting imidazole derivatives of the Formula III with trityl-carbinols (cf. the reaction of the carbinol corresponding to the halide IV with secondary amines). In this case, the imidazole is generally used in an excess of up to about 100%. If the process is carried out under pressure, molar amounts may be used. Furthermore, it may be expedient to carry out the elimination of water azeotropically in the presence of a high boiling inert organic solvent, such as xylene, chlorobenzenes and the like, at the boiling point of the solvent used. In the absence of solvents, the process is carried out at a temperature range of from about 140°C to about 230°C and preferably from about 170°C to about 190°C.

It may further be expedient to facilitate the elimination of water by working in the presence of dehydrating agents, such as e.g. alkaline earth metal oxides (MgO, BaO, CaO) and of $Al_2O_3$, approximately molar amounts being generally used, but possibly also an excess of up to about 2 – 3 moles.

The following Table gives the constants of some N-trityl-imidazoles (I, II) by way of example:

|   |   | m.p.: °C |
|---|---|---|
| (a) | 1-(trisphenyl-methyl)-imidazole | 226–227 |
| (b) | 1-(trisphenyl-methyl)-2-methyl-imidazole | 225 |
| (c) | 1-(trisphenyl-methyl)-2,4-dimethyl-imidazole | 232 |
| (d) | 1-(trisphenyl-methyl)-4,5-diphenyl-imidazole | 228–230 |

-Continued

|   | | m.p.: °C |
|---|---|---|
| (e) | 1-(p-chlorophenyl-diphenyl-methyl)-imidazole | 140 |
| (f) | 1-(p-fluorophenyl-diphenyl-methyl)-imidazole | 145 |
| (g) | 1-(p-tolyl-diphenyl-methyl)-imidazole | 128 |
| (h) | 1-(trisphenyl-methyl)-benzimidazole | 180–181 |
| (i) | 1-(o-chlorophenyl-diphenyl-methyl)-imidazole | 147–149 |
| (j) | 1-(m-chlorophenyl-diphenyl-methyl)-imidazole | 114 |
| (k) | 1-(p-bromophenyl-diphenyl-methyl)-imidazole | 152 |
| (l) | 1-(o-fluorophenyl-diphenyl-methyl)-imidazole | 185 |
| (m) | 1-(m-fluorophenyl-diphenyl-methyl)-imidazole | 174 |
| (n) | 1-(p-nitrophenyl-diphenyl-methyl)-imidazole | 160–170 |
| (o) | 1-(m-trifluoromethylphenyl-diphenyl-methyl)-imidazole | 156 |
| (p) | 1-(p-cyanophenyl-diphenyl-methyl)-imidazole | 164 |
| (q) | 1-(o-methoxyphenyl-diphenyl-methyl)-imidazole | 130 |
| (r) | 1-(p-methylthiophenyl-diphenyl-methyl)-imidazole | 142 |
| (s) | 1-(p-fluorophenyl-diphenyl-methyl)-2-methyl-imidazole | 199 |
| (t) | 1-(p-fluorophenyl-p-chlorophenyl-phenyl-methyl)-imidazole | 144 |
| (u) | 1-(p-chlorophenyl-m-fluorophenyl-phenyl-methyl)-imidazole | 116 |
| (v) | 1-(p-chloro-m-nitrophenyl-diphenyl-methyl)-imidazole | 150 |
| (w) | 1-(p-bromophenyl-p-chlorophenyl-phenyl-methyl)-imidazole | 140 |
| (x) | 1-(m-cyanophenyl-diphenyl-methyl)-imidazole | 119 |
| (y) | 1-(o-cyanophenyl-diphenyl-methyl)-imidazole | 149–151 |

EXAMPLE OF PREPARATION

1-[p-chlorophenyl-diphenyl-methyl]-imidazole (e)

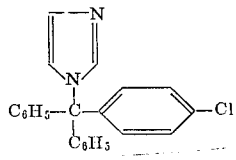

1 Mole p-chlorophenyl-diphenyl-methyl-carbinol is mixed with about 2 moles imidazole and the mixture is heated, without a solvent, at about 180°C for 5 hours. After cooling, the reaction product is reprecipitated from xylene in order to remove the excess imidazole. After another reprecipitation from benzene light petrol, the pure 1-[p-chlorophenyl-diphenyl-methyl]-imidazole is obtained.
M.p. 140°–143°C;
yield 53% of theory.

The same compound can also be obtained, when finely powdered silver salt of imidazole is suspended with the equimolar amount of p-chlorophenyl-diphenyl-methyl chloride in absolute benzene, the mixture is heated with stirring and with the exclusion of light at boiling temperature for about 3 hours, the precipitated silver chloride is subsequently filtered off and the residue remaining after removal of the solvent is recrystallised from benzene/light petrol.

By analogous procedure, 1-(tris-phenyl-methyl)-imidazole is produced from 1-tris-phenyl-methyl-carbinol and imidazole and 1-(p-tolyl-diphenyl)-imidazole is produced from 1-p-tolyl-diphenyl-methyl-carbinol and imidazole.

The other compounds (I, II) can also be obtained according to the above processes. The conversion of the free compounds into the salts is likewise carried out in known manner.

Salts of trityl-imidazoles

N-triphenyl-methyl-imidazolium lactate 31 g N-trityl-imidazole are dissolved by heating in acetonitrile and 10 g (0.11 mole) d,l-latic acid are subsequently added. The residue remaining after distilling off the solvent is caused to crystallise by covering it with ether, the crystallisation product is washed with ether and dried. Yield 40 g of a colourless crystalline powder of m.p. 170°–180°C.

N-triphenyl-methyl-imidazolium chloride 31 g N-trityl-imidazole are dissolved in 400 ml carbon tetrachloride, and hydrogen chloride is subsequently passed into the solution at room temperature. The hydrochloride is precipitated after some time and filtered off with suction. Colourless crystals of m.p. 155°C after recrystallisation from acetone/ether 1:1. Yield 33 g.

The following salts are obtained in an analogous manner:

|   |   | m.p.: °C |
|---|---|---|
| N-triphenylmethyl-imidazolium | maleate | 106 – 117 |
| do. | tartrate | 175 – 180 |
| do. | citrate | 138 – 145 |
| do. | acetate | 231 |
| do. | salicylate | 145 – 168 |
| do. | sorbate | 148 – 160 |
| do. | succinate | 188 – 189 |
| do. | fumarate | 200 – 206 |
| 1-(p-chlorophenyl-diphenyl-methyl)-imidazolium | -chloride | 128–30°C |
| do. | -lactate | 90°C |
| do. | -salicylate | oil |
| 1-(m-chlorophenyl-diphenyl-methyl)-imidazolium | -chloride | 153°C |
| 1-(o-chlorophenyl-diphenyl-methyl)-imidazolium | -chloride | 159°C |
| 1-(p-fluorophenyl-diphenyl-methyl)-imidazolium | -chloride | 110°C |
| do. | -lactate | 95°C |
| 1-(o-fluorophenyl-diphenyl-methyl)-imidazolium | -lactate | 110°C |
| 1-(m-fluorophenyl-diphenyl-methyl)-imidazolium | -lactate | 120°C |
| 1-(p-fluorophenyl-diphenyl-methyl)-imidazolium | -salicylate | 80°C |
| 1-(p-cyanophenyl-diphenyl-methyl)-imidazolium | -chloride | 147°C |
| 1-(o-cyanophenyl-diphenyl-methyl)-imidazolium | -chloride | 131°C |
| 1-(p-cyanophenyl-diphenyl-methyl)-imidazolium | -lacatate | 90°C |

The previously known antimycotics are effective either only against yeasts, such as e.g. Amphotericin B, or only against hyphomycetes, such as e.g. Griseoulvin.

In contrast thereto and surprisingly, the compounds (I, II) and their salts are effective against hyphomycetes as well as against yeasts, even in the case of oral administration. It is another advantage that the compounds according to the invention are well tolerated by warm-blooded animals.

The compounds can be used as antimycotics, inter alia, in the form of an aqueous emulsion, suspension or solution which can be administered per os. It is also possible to use aqueous solutions of the new salts of the said compounds (I).

THERAPEUTIC EFFECT 1. in vitro — effect against human — pathogenic fungi:
   a. Candida albicans:
      compound (a) 40 γ/ml
      compound (e)<4 γ/ml    fungistatic
      compound (f)<4 γ/ml
      compound (g)<4 γ/ml
      compound (i)<4 γ/ml
      compound (p)<4 γ/ml
   b. Trichophyton mentagrophytes:<4–10γ fungistatic microsp. fel.<4 γ

The test medium was Milieu d'epreuve according to Sabouraud.

The spectrum of activity and the intensity of activity (compound i) (in vitro) can be seen from the following table:

| Minimum inhibiting concentration As γ/ml | | without serum | with serum |
|---|---|---|---|
| (1) | Trich. asteroides | 1 | 1 |
| (2) | Trich. crateriforme | 1 | 10 |
| (3) | Trich. equinum (NL) | 1 | 10 |
| (4) | Trich. equinum, wooly (Hoechst) | 1 | 10 |
| (5) | Trich. equinum, gran. (Hoechst) | 1 | 10 |
| (6) | Trich. tonsurans | 1 | 2 |
| (7) | Trich. verrucosum | 1 | 4 |
| (8) | Trich. granulosum | 1 | 2 |
| (9) | Trich. interdigitale | 1 | 4 |
| (10) | Trich. megninii | <0.1 | 1 |
| (11) | Trich. mentagrophytes | <0.1 | 1 |
| (12) | Trich. rubrum | 1 | 2 |
| (13) | Microsp. audouinii | 1 | |
| (14) | Microsp. canis (NL) | <0.1 | |
| (15) | Microsp. canis (our isolation) | 1 | |
| (16) | Microsp. duboisii | 1 | |
| (17) | Microsp. fulvum | 1 | |
| (18) | Microsp. gallinae | 1 | |
| (19) | Microsp. fellineum | 1 | |
| (20) | Aspergillus niger | 1 | 4 |
| (21) | Pen. comune | 1 | |
| (22) | Mucor mucedo | 4 | >10 |
| (23) | Blakeslea trispora | 10 | >10 |
| (24) | Cand. albicans | 40 – 1 fungistase | 40–1 |

2. Effect in vivo
   a. Experimental candidosis in white mice
      In the case of oral administration, curative effects can be achieved with daily doses of 2 – 3 times 0.5 – 1 mg/mouse/day.
   b. Experimental trychophytia in mice caused by Trich. quinckeanum
      Development of the infection is prevented by daily doses of 1 – 2 times 1 – 2 mg/mouse orally.
   c. Experimental trichophytia in guinea pigs caused by Trich.ment.
      When 15 – 30 mg are administered twice per os to guinea pigs weighing 400 grams, a reproducible effect on the course of the infection and rapid healing of the mycotic lesions is found.

Equally effective results are produced when other compounds within the scope of (I) or salts of compounds within the scope of (I) and specifically salts of compounds (a),(e),(f),(g),(i) and (P) are used. Compounds which are unsubstituted in the imidazole ring may be substituted in one phenyl group by a halogen atom, preferably chlorine or fluorine in the o-, m- or p-position; such compounds and their salts with hydrochloric acid, lactic acid or salicylic acid are particularly useful. The following usages and dosage ranges are used for the compounds of the present invention:
   a. for use with humans:
      1. dermatomycoses, caused by fungi of the species Trychophytes, Microsporium Epidermophytes, Aspergillus, Candida albicans and other yeasts;
      2. organomycoses caused by yeasts, mould fungi and dermatophytes;
   b. for veterinary use:
      dermatomycoses and organomycoses caused by yeasts, mould fungi and dermatophytes.

The compounds of the present invention are administered orally or parenterally as well as locally in the form of solutions, e.g., dimethyl sulphoxide/glycerol/water 2:2:6, alcohol, preferably ethanol and isopropanol, buffer solutions, powders, tablets.

The dosage range for humans is in the range of from about 20 to about 100 mg/kg and preferably from about 40 to about 60 mg/kg. Administration is generally recommended at intervals of about 12 hours and such administration should be continued for from about 10 to about 60 days.

Nevertheless it may sometimes be necessary to digress from the aforesaid amounts, dependent on the method of administration or also on account of individual reactions to the medicine or on the type of its formulation and the moment in time or the intervals at which it is administered. In some cases, it may be sufficient to use less than the minimum amount stated above, whereas in other cases it may be necessary to go beyond the stated upper limit. If larger amounts are applied, it may be advisable to distribute these over a day in several individual doses.

The compounds of the present invention can be used either as such or in combination with pharmaceutically acceptable carriers. Suitable forms for administration in combination with various inert carriers are tablets, capsules, powders, sprays, aqueous suspensions, injectable solutions, elixirs, syrups and the like. Carriers of this type comprise solid extenders or fillers, a sterile aqueous medium as well as various non-toxic organic solvents and the like. Obviously, the tablets and the like suitable for oral administration can be provided with an addition of saccharin or a similar additive. In the aforesaid case, the therapeutically active compound should be present in the total mixture at a concentration of about 0.5 to 90 percent by weight, i.e., in quantities which suffice to attain the range of dosage mentioned above.

In the case of oral administration, obviously, tablets may also contain additives such as sodium citrate, calcium carbonate and dicalcium phosphate together with various additives such as starch, preferably potato starch and the like, and binders such as polyvinylpyrrolidone, gelatin and the like. It is further possible to add lubricants such as magnesium stearate, sodium lauryl-sulphate and talc for producing tablets. In the case of aqueous suspensions and/or elixirs which are intended for oral administration, the active ingredient may be used together with various agents for improving the flavor, dyestuffs, emulsifiers and/or diluents, such as water, ethanol, propylene-glycol, glycerol and other compounds or combinations of this type.

In the case of parenteral administration, there may be used solutions of the active ingredients in sesame or peanut oil or in aqueous propylene-glycol of N,N-dimethyl formamide, as well as sterile aqueous solutions if the compounds are water-soluble. Such aqueous solution should be buffered in the usual manner, if required, and the liquid diluent should previously be rendered isotonic by the addition of the necessary amount of salt or glucose. These aqueous solutions are particularly suitable for intravenous, intramuscular and intraperitoneal injections.

In humans, a dosage of 40 mg/kg administered at intervals of 12 hours result in a blood level of between 5 and 11 γ/ml. The half-life period in human serum in vivo amounts to 6 hours on the average. Up to 30 to 40 percent of the administered amount of the substance are excreted with the urine in active form. The resorption quota amounts to more than 70 percent in the case of oral administration.

The $LD_{50}$ for mice, rats, rabbits, dogs and cats lies between about 600 and 2200 mg of the stated compounds/kg body weight in the case or oral administration.

The present invention also includes pharmaceutial compositions comprising at least one of the N-tritylimidazoles or salts thereof in admixture with a solid or liquid diluent or carrier which may be any of the conventional diluents or carriers used in pharmaceutical compositions.

The present invention also includes unit dosage forms of medication which comprise at least one of the compounds of the present invention either alone or in admixture with a solid or liquid diluent or carrier. The compounds of the present application may include a protective envelope or cover containing the active compound within. Unit dosage form means that the composition is in the form of discrete portions, each containing a unit dose or a multiple or sub-multiple of the unit dose of the active ingredient which is the compound of the present invention. Such portions may, for example, be in monolithic coherent form, such as tablets, suppositories, pills or dragees; in wrapped or concealed form, such as wrapped powders, cachets, sachets or capsules, in ampules such as in sterile solution; or in other forms known to the art.

What is claimed is:
1. N-triphenyl-methyl-imidazolium lactate.
2. N-triphenyl-methyl-imidazolium chloride.
3. N-triphenyl-methyl-imidazolium maleate.
4. N-triphenyl-methyl-imidazolium tartrate.
5. N-triphenyl-methyl-imidazolium citrate.
6. N-triphenyl-methyl-imidazolium salicylate.
7. N-triphenyl-methyl-imidazolium sorbate.
8. N-triphenyl-methyl-imidazolium succinate.
9. N-triphenyl-methyl-imidazolium fumarate.

* * * * *